United States Patent Office 3,700,413
Patented Oct. 24, 1972

3,700,413
PROCESS FOR MAKING EXTRA-PURE ARSENIC BY SUBLIMATION IN THE PRESENCE OF CARBON OR BORON
Klaus Bienert, Winfried Lang, Egon Nordt, and Herbert Weidner, Burghausen, Upper Bavaria, Germany, assignors to Wacker-Chemitronic Gesellschaft fur Elektronik-Grundstoffe m.b.H., Burghausen, Upper Bavaria, Germany
No Drawing. Filed Apr. 26, 1971, Ser. No. 137,588
Claims priority, application Germany, Apr. 30, 1970, P 20 21 332.5; Jan. 22, 1971, P 21 03 066.0
Int. Cl. B01d 7/00; C22b 33/00
U.S. Cl. 23—294                                                        6 Claims

ABSTRACT OF THE DISCLOSURE

Process for making extra-pure arsenic which is particularly low in silicon and oxygen content, which comprises sublimating a mass of arsenic in the presence of a comminuted surface-active or surface-reactive substance such as carbon or boron, preferably in spectrally pure form.

---

The manufacture of extra-pure arsenic is of special importance for the production of gallium arsenide compound semiconductors.

Generally the purification of the arsenic is carried out through sublimation in quartz vessels at a temperature of about 600° C. Here it appears that the silicon and oxygen content in the arsenic, through the reaction of the arsenic vapor with the surface of the quartz wall, increases during sublimation. Thus arsenic purified with such process contains about 50 p.p.m. of silicon.

It has further been described elsewhere how to convert arsenic into arsenic trichloride and to reduce the latter to extra-pure arsenic after a fractional distillation with hydrogen. (DBP #1,169,138.) With another method, the arsenic trichloride is hydrolyzed with water to arsenic trioxide and thereafter is also reduced with hydrogen. With this process too, no fully satisfactory purity is achieved since either too much oxygen remains in the arsenic, or still about 20 p.p.m. of silicon are contained therein.

We have now discovered a process for manufacturing extra-pure arsenic which is especially low in silicon and oxygen content, by means of sublimation. The process is characterized by the fact that the sublimation is carried out in the presence of a comminuted surface-active and/or reactive substance.

It is surprising that in spite of the low sublimation temperature, the incorporation of the impurities into the arsenic mesh is for the most part prevented through the surface-active and/or reactive substance.

Particularly suitable as surface-active and/or reactive and/or reactive substances are carbon and/or boron, preferably in spectrally pure form. Aluminum in the form of powder may also be used. These substances may be arranged in layers over the arsenic to be sublimated, or they may also be mixed with the arsenic, or they may be piled up near the arsenic inside the sublimation vessel. The quantity of the substances added is not of decisive significance. However, not less than 5% by weight of the arsenic to be sublimated should be added. A quantity over 50% by weight is no longer meaningful for economic reasons, although the process can be carried out with even greater quantities. 10 to 30% by weight are preferred.

The sublimation is carried out in the known manner. For instance, an arsenic source is heated and the arsenic vapor is separated at a cooler spot of the sublimation device.

The evaporation temperature is in most cases from 350 to 800° C., preferably it should be between 450 and 600° C., and the separation temperatures lie between 300 and 750° C., and should preferably be between 400 and 550° C.

Often the setting of the temperature is achieved through a resistance heated oven with an approximately linear temperature profile. With this, the temperature gradient should not be very great in order not to bring about too quickly an over-sublimation of the arsenic.

It is advantageous to set a temperature gradient of 0.2 to 5° C./cm., with the evaporation temperature being selected below 600° C., preferably near 500° C., and the separation temperature above 400° C.

In this manner, both too rapid a sublimation, as well as a pulling along of impurities, and the incorporation of gaseous impurities into the sublimation through too rapid a separation, are prevented.

The sublimation can be carried out in a vacuum without turning off the pump. This has the advantage that no gaseous impurities can accumulate in the sublimation vessel. Furthermore it is possible to operate in the closed evacuated system. This method is to be preferred where only pump systems are available which could possibly bring impurities into the sublimation vessel. Sublimation may also be carried out under inert gas protection, particularly with hydrogen, nitrogen, and argon. The inert gas slows down the sublimation which in the case of high temperature gradients is advantageous.

The pressure inside the sublimation vessel is determined by the arsenic vapor pressure with the conditions used. If the process is carried out under inert gas protection, then the overall pressure can be determined by setting the inert gas pressure. Operation is here carried out in most cases under normal pressure.

Quartz tubes can be used as sublimation vessels. However, it has been found that a slight abrasion of the quartz walls can take place and the silicon content of the sublimated arsenic may be raised thereby and minor fluctuations may occur. In most cases it is therefore advantageous to sublimate in pipes, preferably in conical pipes, where at least the inner surface consists of abrasion-proof material.

In a preferred application, the conical pipe consists of quartz which is covered with an abrasion-proof protective layer or coating, preferably of boron nitride. It may also be lined with a pipe made of abrasion-proof material, or the entire pipe in which sublimation is carried out may be made of an abrasion-proof material.

Aluminum nitride or aluminum oxide may be used for instance as abrasion-proof substances, preferably boron nitride.

Such materials adhere very well to quartz pipes when arranged in layers. Other substances may also be used as pipe materials, for example ceramics or carbon.

The manufacture of the pipes or coatings may be done through gas phase separation. With this, pure and compact bodies are obtained, by the method as per the German publication document 19 43 582, with which pure boron nitride is separated from boric acid alkyl esters and ammonia.

The coatings are in most cases applied in thicknesses from 5 to 300 $\mu$m., preferably from 10 to 150 $\mu$m. Prior to the coating, the pipe is roughened, for instance by sand-blasting, or in the case of quartz vesels also through etching with hydrofluoric acid.

The extra-pure arsenic (purity greater than 99.99–99% weight) produced by the process of this invention is used particularly for the manufacture of high quality compound semiconductors of gallium arsenide, and for the doping of semiconductors with arsenic.

EXAMPLE 1

Into a unilaterally closed, vertical standing quartz tube of 50 mm. thickness and 1.20 m. long, 300 g. of arsenic are filled at one end, which are topped by 50 g. spectrally pure carbon powder. A sorption pump system is connected to the open end of the tube. A resistance heated oven is placed over the quartz tube, with an approximately linear temperature profile (minimum temperature 400 °C., temperature of the arsenic source 500° C., temperature gradient 0.8° C./cm.) and the arsenic is completely over-sublimated. The silicon content decreased from 20 p.p.m. to 1 p.p.m. The decrease of the oxygen content can be proven by means of the growth symptoms, as can the stability of the electrical values of the gallium arsenide manufactured from this arsenic.

EXAMPLE 2

In a phial, 300 g. of arsenic, containing 50 p.p.m. of silicon, are covered with 50 g. of spectrally pure boron powder. The phial is evacuated and fused off. Sublimation is carried out under the same temperature conditions as in Example 1. After this purification, the arsenic contains only 2 p.p.m. silicon.

EXAMPLE 3

A quartz tube of 1.20 m. length and 45 mm. diameter, through conversion of boric acid trimethyl ester with ammonia, was covered with a boron nitride layer of about 100 µm. thickness. In the unilaterally closed tube, 250 g. of arsenic covered with 50 g. of spectrally pure carbon powder are prepared. Through heating with a resistance oven, with a temperature of the arsenic source of 500° C., and a separation temperature of 420° C., the arsenic is sublimated under vacuum. The silicon content decreased from 30 p.p.m. to 0.3 p.p.m., a boron content could not be detected through spectral-analytical methods.

EXAMPLE 4

In another test, 250 g. of arsenic were covered with 50 g. spectrally pure boron powder and were sublimated under the conditions as per Example 1. A decrease of the silicon content from 50 to 0.5 p.p.m. was verified.

The invention claimed is:

1. Process for making extra-pure arsenic which is particularly low in silicon and oxygen content, which comprises sublimating a mass of arsenic in the presence of a comminuted material selected from the group of surface-active and surface-reactive substances consisting of carbon and boron in spectrally pure form.

2. Process according to claim 1, in which the surface-active or reactive substance is used in quantities of from 5 to 50% by weight, referred to the arsenic to be sublimated.

3. Process according to claim 1, in which the sublimation is carried out at an evaporation temperature of from 350 to 800° C. and a separation temperature of from 300 to 750° C.

4. Process according to claim 1, in which the sublimation is carried out with a teperature gradient from 0.2 to 5° C./cm., with the evaporation temperature being below 600° C. and the separation temperature over 400° C.

5. Process according to claim 1, in which the sublimation is carried out in a conical pipe, at least the inner surface of said pipe consisting of abrasion-proof material.

6. Process according to claim 5, in which said conical pipe consists of quartz covered by an abrasion-proof material selected from the group consisting of boron nitride, aluminum nitride and aluminum oxide.

References Cited

UNITED STATES PATENTS

| | | | |
|---|---|---|---|
| 3,047,366 | 7/1962 | Williams | 23—294 |
| 3,077,384 | 2/1963 | Enk et al. | 23—301 |
| 3,210,165 | 10/1965 | Van Run et al. | 23—301 |
| 3,242,015 | 3/1966 | Harris | 23—301 |
| 3,260,573 | 7/1966 | Ziegler | 23—301 |
| 3,567,379 | 3/1971 | Henriksson | 23—209 |
| 3,649,192 | 3/1972 | Deyris | 23—300 |

FOREIGN PATENTS

| | | | |
|---|---|---|---|
| 21,958 | 10/1963 | Japan | 23—209 |
| 11,759 | 6/1964 | Japan | 23—209 |
| 11,760 | 6/1964 | Japan | 23—209 |

NORMAN YUDKOFF, Primary Examiner

R. T. FOSTER, Assistant Examiner

U.S. Cl. X.R.

23—209